(12) United States Patent
Lucas (10) Patent No.: US 12,240,286 B2
(45) Date of Patent: *Mar. 4, 2025

(54) AIR SPRING CONTROL SYSTEM, AIR SPRING SYSTEM, VEHICLE INCLUDING SAME, AND METHOD FOR SAME

(71) Applicant: ZF CV Systems Europe BV, Brussels (BE)

(72) Inventor: Johann Lucas, Sehnde (DE)

(73) Assignee: ZF CV Systems Europe BV, Brussels (BE)

( * ) Notice: Subject to any disclaimer, the term of this patent is extended or adjusted under 35 U.S.C. 154(b) by 219 days.

This patent is subject to a terminal disclaimer.

(21) Appl. No.: 17/717,923

(22) Filed: Apr. 11, 2022

(65) Prior Publication Data

US 2022/0234409 A1 Jul. 28, 2022

Related U.S. Application Data

(63) Continuation of application No. PCT/EP2020/081467, filed on Nov. 9, 2020.

(30) Foreign Application Priority Data

Nov. 7, 2019 (DE) ...................... 10 2019 130 087.8

(51) Int. Cl.
*B60G 17/018* (2006.01)
*B60G 11/27* (2006.01)
(Continued)

(52) U.S. Cl.
CPC ....... *B60G 17/018* (2013.01); *B60G 17/0155* (2013.01); *B60G 17/052* (2013.01);
(Continued)

(58) Field of Classification Search
CPC ............ B60G 17/0155; B60G 17/0165; B60G 17/052; B60G 17/0523; B60G 2202/152;
(Continued)

(56) References Cited

U.S. PATENT DOCUMENTS 6,029,764 A * 2/2000 Schubert ............. F16F 15/0275
296/190.07
6,206,481 B1 * 3/2001 Kaisers ................. B60T 15/027
303/118.1
(Continued)

FOREIGN PATENT DOCUMENTS

DE           10245815 A1 *  4/2004 ........... B60G 17/015
DE   10 2014 101 084 A1      7/2015
(Continued)

OTHER PUBLICATIONS

Translation of the Written Opinion of the International Searching Authority dated Feb. 5, 2021 for international application PCT/EP2020/081467 on which this application is based.

(Continued)

*Primary Examiner* — Babar Sarwar
(74) *Attorney, Agent, or Firm* — Walter Ottesen, P.A.

(57) ABSTRACT

An air suspension control system is for a vehicle with a first and a second axle. The system has an auxiliary control unit connected to a main control unit via a data link. The auxiliary unit has a pressure sensor associated with the first axle for determining pressure measurements of the first axle as pressure sensor signals and an input for receiving height sensor signals. The input can be connected to a first height sensor on the first axle for receiving first height signals and to a second height sensor on the second axle for receiving second height signals. The auxiliary unit is adapted to transmit the first and/or second height sensor signals and/or the pressure sensor signals to the main unit. The main unit is adapted to carry out weighing for the first and/or second (Continued)

axle in dependence on the first and/or second height signals and/or the pressure signals.

19 Claims, 3 Drawing Sheets

(51) Int. Cl.
  *B60G 17/015* (2006.01)
  *B60G 17/052* (2006.01)
  *G01G 19/10* (2006.01)
(52) U.S. Cl.
  CPC .............. *G01G 19/10* (2013.01); *B60G 11/27* (2013.01); *B60G 2202/152* (2013.01); *B60G 2400/252* (2013.01); *B60G 2400/51222* (2013.01); *B60G 2400/61* (2013.01); *B60G 2500/30* (2013.01); *B60G 2600/182* (2013.01); *B60G 2600/71* (2013.01); *B60G 2800/70* (2013.01); *B60G 2800/914* (2013.01)
(58) Field of Classification Search
  CPC .......... B60G 2204/62; B60G 2400/252; B60G 2400/51222; B60G 2500/20; B60G 2500/201; B60G 2500/204; B60G 2500/30; B60G 2600/182; B60G 2600/71; B60G 2800/162; B60G 2800/91; B60G 2800/914; B60G 2800/98
  See application file for complete search history.

(56) References Cited

U.S. PATENT DOCUMENTS

| | | | | |
|---|---|---|---|---|
| 11,745,558 | B2 * | 9/2023 | Anderson | B60G 17/0182 701/37 |
| 2005/0040573 | A1 * | 2/2005 | Bolt | B60G 11/27 267/64.28 |
| 2005/0248069 | A1 * | 11/2005 | Bolt | B60G 17/0155 280/124.16 |
| 2006/0267297 | A1 * | 11/2006 | Nordmeyer | B60G 11/27 280/124.16 |
| 2014/0288776 | A1 * | 9/2014 | Anderson | F16F 9/064 701/37 |
| 2015/0224845 | A1 * | 8/2015 | Anderson | F03G 7/08 701/37 |
| 2017/0246926 | A1 * | 8/2017 | Macnamara | B62D 61/12 |
| 2018/0141400 | A1 * | 5/2018 | Liu | B60G 17/033 |
| 2018/0186208 | A1 * | 7/2018 | Coombs | B60G 17/0165 |
| 2018/0345747 | A1 * | 12/2018 | Boon | B60G 17/018 |
| 2019/0337349 | A1 * | 11/2019 | Delorenzis | F16F 9/05 |
| 2020/0406700 | A1 * | 12/2020 | Jovers | B60G 11/27 |
| 2021/0039469 | A1 * | 2/2021 | Vaughan | B60G 17/0525 |
| 2021/0245567 | A1 | 8/2021 | Zak et al. | |

FOREIGN PATENT DOCUMENTS

| | | | | |
|---|---|---|---|---|
| DE | 102017011753 | A1 * | 6/2019 | ............. B60G 11/14 |
| DE | 10 2018 111 003 | A1 | 11/2019 | |
| DE | 10 2018 128 233 | A1 | 5/2020 | |
| DE | 10 2019 111 187 | A1 | 11/2020 | |
| EP | 2 902 225 | A1 | 8/2015 | |
| WO | 2004/030956 | A1 | 4/2004 | |
| WO | 2004/082967 | A2 | 9/2004 | |
| WO | WO-2015105454 | A1 * | 7/2015 | ........... B60G 17/052 |

OTHER PUBLICATIONS

International Search Report of the European Patent Office dated Feb. 5, 2021 for international application PCT/EP2020/081467 on which this application is based.

\* cited by examiner

AIR SPRING CONTROL SYSTEM, AIR SPRING SYSTEM, VEHICLE INCLUDING SAME, AND METHOD FOR SAME

CROSS REFERENCE TO RELATED APPLICATIONS

This application is a continuation application of international patent application PCT/EP2020/081467, filed Nov. 9, 2020 designating the United States and claiming priority from German application 10 2019 130 087.8, filed Nov. 7, 2019, and the entire content of both applications is incorporated herein by reference.

TECHNICAL FIELD

The disclosure relates to an air suspension control system for a vehicle. The disclosure relates additionally to an air suspension system which is controllable via an air suspension control system, to a vehicle having such an air suspension system and/or air suspension control system, and to a method for operating such a vehicle.

BACKGROUND

The vehicle can be a commercial vehicle, such as, for example, a bus, a truck or a truck-trailer combination, or a passenger vehicle. Air suspension control systems are also referred to as ECAS (electronically controlled air suspension).

Air suspension systems for vehicles are known which improve ride comfort and safety by the use of air springs. This is achieved, for example, by protecting the structure and occupants of a vehicle via the air springs against jolts caused by unevenness of the ground when the vehicle is moving. In addition, vibrations caused by unevenness of the ground when the vehicle is moving can be damped or even prevented.

In the case of air suspension systems, a distinction is further to be made between adjustable and non-adjustable suspension systems. Adjustable air suspension systems usually have a variable gas mass, preferably air mass, of the air springs, while the gas mass of the air springs is fixed in the case of non-adjustable air suspension systems. Non-adjustable air springs can be used primarily for the above-mentioned purposes, while adjustable air springs permit enhanced functions. Such an enhanced function of an adjustable air suspension system is, for example, level control, in which an adjustment of the ride height of a vehicle, for example in dependence on a vehicle load, is kept constant.

In order to achieve further functions, adjustable or variable air suspension systems have an air suspension control system which varies the gas mass in a spring element in dependence on sensors, for example. Manual intervention with control signals, as is known, for example, in the case of an automatic lowering system in a bus for facilitating the entry and exit of passengers, is also known.

In the present case, consideration is to be given to an adjustable air suspension system in which a variable gas mass is used in air springs, in particular for the suspension of a vehicle. In this case, not all the axles of the vehicle are necessarily sprung via the air suspension, but rather one or more axles of the vehicle can be steel-sprung.

As already mentioned above, such air suspension systems generally have an air suspension control system which is connected to a plurality of sensors and actuators for controlling the gas mass of the air springs. A plurality of measured values is thus supplied to an air suspension control system, which is usually part of a control device including further functions. In addition, the control device must transmit a plurality of commands far actuating the actuators. Moreover, the control device must have a quick response time in order to generate corresponding control signals from the plurality of measured values.

A control device which the air suspension control system includes is therefore subject to a highly complex development effort and requires a very high computing capacity. In particular, the air suspension system as a whole is shut down in the event of failure of the control device.

Non-prepublished German patent application DE 10 2018 111 003.0 (corresponding to US 2021/0245567) of the applicant discloses an air suspension control system (ELAS) for a commercial vehicle or a passenger vehicle. The air suspension control system has a main control unit for operating the air suspension control system. In addition, the air suspension control system includes at least two auxiliary control units. The auxiliary control units are each connected to the main control unit via a data link. The data link is either a shared data link or a separate data link. That is, in the case of a shared data link, the main control unit and the two auxiliary control units are connected to a shared data line, for example including two or more electrical conductors. If the data link is in the form of a separate data link, this means that a separate data line is provided between the main control unit and each of the at least two auxiliary control units.

Each of the auxiliary control units has at least one output. The output serves to actuate at least one actuator which can be connected to the output. An actuator is, for example, an adjustment drive for a valve. Preferably, the actuator is an electromagnetic valve component, which is, for example, a pneumatic or hydraulic valve component. Particularly preferably, the valve is a solenoid valve.

At least one function for generating control signals at the output can be stored in each of the auxiliary control units. That is, the auxiliary control unit is preferably adapted to actuate an output in dependence on a stored function which is stored in the auxiliary control unit.

The main control unit is additionally adapted to call up and/or parameterize the stored function. This is effected by the transmission of commands via the data link from the main control unit to the auxiliary control unit whose function is to be called up and/or parameterized.

Calling up is to be understood here and in the following as meaning in particular that, by calling up a function, the auxiliary control unit is brought into operation with that function and control signals are subsequently generated at the output of the auxiliary control unit in dependence on the called-up function.

Here and in the following, the term function is not limited to a mathematical function in the sense of a representation of a relationship between two quantities. Rather, the term function is also to be understood in the present case in its meaning as used in computer science. Accordingly, a function is a program construct which without input values, or preferably with input values, for example including input data and/or sensor data and/or a parameterization, generates output values.

Compared to conventional air suspension control systems which have only a single control unit with which all the actuators are actuated via their outputs, the control unit according to DE 10 2018 111 003.0 is thus of modular construction. The main control unit serves substantially only to call up and/or parameterize the functions stored in the auxiliary control units.

A stored function can be, for example, a level control function. Accordingly, the level control function is called up by the main control unit in the auxiliary control units as required. The parameter specified by the main control unit to the auxiliary control units can be, for example, a desired ride height which is to be kept constant. When the level control function is called up, valves are then actuated in the auxiliary control unite such that gas masses are guided into or out of the air springs in order to keep the specified ride height substantially constant.

If remaining with the above example of the level control function level control of one or more air springs is to be carried out by all the auxiliary control units, the main control unit can, for example, call up the corresponding function or level control function in a single call to all the auxiliary control units. After calling up the level control function, the main control unit no longer has to interact for this purpose.

A modular construction of the air suspension control system is thereby possible, so that, for example, the same main control unit can always be used in the vehicle irrespective of the number of necessary auxiliary control units. In addition, data traffic on the data link(s) can be greatly reduced or even avoided completely once a function has been called up. The bandwidth of a data link can thus be used for other communications.

In addition, a lower computing capacity of the main control unit is also necessary, since the functions are relocated into the auxiliary control units. A main control unit, with the same computing capacity, can thus perform other functions and can be limited, in terms of an air suspension, substantially to superordinate monitoring functions of the air suspension without having to carry out a time-critical control of the air suspension.

SUMMARY

Accordingly, it is an object of the disclosure to provide an air suspension control system which provides enhanced functions with a lower structural outlay.

The disclosure uses the modular construction of the air suspension control system having a main control unit and auxiliary control units according to DE 10 2018 111 003.0 in a particular way: According to the disclosure, it has been recognized that, for the particular case of a vehicle with an air-sprung first axle and a second axle which does not necessarily have to be air-sprung, the at least two auxiliary control units according to DE 10 2018 111 003.0 are not necessary, but rather complete functionality can be achieved with an even simpler air suspension control system.

The air suspension control system is provided for a vehicle with a first axle and a second axle. The air suspension control system has a main control unit for operating the air suspension control system and an auxiliary control unit which is connected to the main control unit via a data link. The auxiliary control unit has a pressure sensor associated with the first axle of the vehicle for determining pressure measurements of the first axle. The pressure measurements are processed as pressure sensor signals. The pressure sensor can be integrated in the auxiliary control unit.

The auxiliary control unit additionally has an input for acquiring height sensor signals. A first height sensor arranged on the first axle of the vehicle and a second height sensor arranged on the second axle of the vehicle can be connected to the input. First height measurements can be received as first height sensor signals by the first height sensor arranged on the first axle of the vehicle. Second height measurements can be received as second height sensor signals by the second height sensor arranged on the second axle of the vehicle.

The auxiliary control unit is adapted to transmit the first and/or second height sensor signals and/or the pressure sensor signals to the main control unit via the data link. The main control unit is adapted to carry out on-board weighing for the first axle and/or the second axle in dependence on the first and/or second height sensor signals and/or the pressure sensor signals.

The first and second height sensor signals and the pressure sensor signals are combined together as "sensor signals" in the following. Thus, when on-board weighing or a function is carried out in dependence on a sensor signal, the on-board weighing or the function can be carried out in dependence on a first height sensor signal, on a second height sensor signal and/or on a pressure signal or on any desired combinations thereof.

Vehicles which have a first axle and a second axle can but do not have to be two-axle vehicles. Vehicles which have a first and a second axle can have a driven axle, which can be a rear axle. The driven axle can be air-sprung. The further of the two axles, which can correspondingly be a front axle, can likewise be air-sprung. However, the further of the two axles can also be steel-sprung. In particular in the case where the further axle is steel-sprung, it is not necessary for operation of the air suspension control system that an auxiliary control unit is arranged on the further axle, since no air-suspension bellows and no actuators which can be actuated to admit air to and remove air from the air-suspension bellows are arranged on a steel-sprung axle. Steel springs do not have to be actuated during operation. In this case, an air suspension control system according to DE 10 2018 111 003.0 having at least two auxiliary control units that is, here an auxiliary control unit for each of the two axles would be unnecessarily complex, elaborate and expensive, and also more susceptible to faults owing to the use of increased electronics by the two auxiliary control units. The disclosure can thus be used in particular in vehicles in which it is not necessary to use more than only one auxiliary control unit for operating an air suspension.

Indeed, it can be also desirable in the case of such a vehicle, in which more than one auxiliary control unit is not necessary for controlling the air suspension, to utilize additional functionalities of the air suspension control system which go beyond immediate air suspension control. These can include, for example, on-board weighing, in which a load of the vehicle is determined directly on the loaded vehicle. On-board weighing can be used, for example, in vehicles which are frequently unloaded and loaded during operation, in order to ensure that such vehicles on the one hand transport as large a load as possible, in order to be efficient, but on the other hand are also not overloaded, which could lead on the one hand to increased wear and on the other hand to immediate danger. On-board weighing can, however, also be used, for example, in the case of the purchase or sale of bulk material, in order to be able to determine an added quantity of the bulk material particularly easily, in order to determine a total price. For on-board weighing, a height sensor is to be provided on each axle at which the axle load is to be determined, in order to determine a deflection at that axle if it is a steel-sprung axle. If it is an air-sprung axle, a pressure sensor is to be provided, in order to determine a bellows pressure in air-suspension bellows on that axle.

The main control unit can calculate an axle load for the axle in question from the deflection or the bellows pressure and an axle load characteristic curve stored in the main control unit. For calculation of an axle load, reference is made to patent applications DE 10 2018 128 233.8 and DE 10 2019 111 187.0 of the applicant, in which examples of methods for determining an axle load of an air-sprung axle or of a steel-sprung axle are described.

The pressure sensor and/or the height sensors can also be used for other functions in the vehicle. For example, the pressure sensor can also be used for pressure ratio control between drive axles and trailing and/or lift axles. In the case of an air-sprung axle, an associated height sensor can also be used for determining a distance between the chassis and the axle.

According to an embodiment of the disclosure, the input of the auxiliary control unit can be connected to a further sensor in order to receive further sensor signals. The further sensor can be, for example, a sensor for detecting distances between the axles and the wheel housings, for example, or a distance of a floor of the vehicle from the ground. Alternatively or cumulatively, it is also possible that the auxiliary control unit, in order to receive further sensor signals of the further sensor or of a further sensor, has a further input which can be connected to the further sensor in order to receive the further sensor signals.

According to an embodiment of the disclosure, the auxiliary control unit can have an output for actuating an actuator which can be connected to the output. A function for generating control signals at the output can then be able to be stored in the auxiliary control unit, and the main control unit can be adapted to call up and/or parameterize at least the stored function by transmitting commands via the data link. The auxiliary control unit can then be adapted to generate control signals at the output in dependence on the first and/or second height sensor signals and/or the pressure sensor signals, Preferably, the auxiliary control unit is adapted to generate control signals at the output in dependence on the sensor signals and a function, in particular a stored, called-up function. Accordingly, values of sensor signals or values derived therefrom are particularly preferably so linked with a function that is carried out in the auxiliary control unit that specific control signals are generated at the output.

In the case of the above-mentioned level control function, a current state of the prevailing ride height, for example, determined via one of the height sensors or via both height sensors, is supplied to the auxiliary control unit as sensor data, so that an actuator for changing the ride height or for maintaining the ride height can correspondingly be actuated at the output. Complete control of a single closed system is thus possible with an auxiliary control unit when, for example, sensor data are considered as the actual value, the function has target value specifications and control takes place via the output by actuation of one or more actuators.

A single, self-contained control system including the auxiliary control unit can accordingly carry out control in an autonomous manner, separately from and independently of the main control unit, once it has been activated by the calling up of a function by the main control unit. The above-mentioned parameterization of the function can represent, for example, a target value specification for the function.

In particular for adjusting an actuator for varying or keeping constant a ride height via an auxiliary control unit, complete controllability by the auxiliary control unit without further instructions by a main control unit is possible by acquiring distances, for example, between the axles and the wheel housings or between the distance of the floor of the vehicle from the ground and/or by recording pressure measurements with a pressure sensor in order to evaluate a loading situation.

According to an embodiment of the disclosure, the auxiliary control unit is adapted to receive and interpret at least one predefined fixed set of commands from the main control unit. The auxiliary control unit can also be adapted to store a predefined fixed set of functions in the auxiliary control unit. Accordingly, the main control unit, for example, is configured with a fixed set of commands, wherein the interpretation of a command takes place in dependence on the configuration of a function stored in the auxiliary control unit.

An individual adaptation of the air suspension control system can accordingly take place solely by adaptation of the auxiliary control unit, Thus, the main control unit can always be identical, irrespective of the individual construction of a vehicle or the requirements of the vehicle in which an air suspension control system is to be used. The same main control unit can accordingly be used, for example, for a plurality of different individual vehicles, so that it is possible to produce the main control unit less expensively because of the large quantities that are required.

According to a further embodiment, the auxiliary control unit is also adapted to transmit sensor signals to the main control unit via the data link when a command is sent by the main control unit via the data link and this command is received by the auxiliary control unit. The command can be, for example, that a sensor signal is to be read. Preferably, the main control unit can accordingly be used as a monitoring body, for example for a correct function, even if control using sensors and actuators is itself carried out within the auxiliary control unit. The main control unit is, for example, so configured that, at intervals or when triggered by a request from a further superordinate body, it checks, on the basis of sensor signals or other data of the auxiliary control unit, that the auxiliary control unit is operating correctly and/or without error.

The auxiliary control unit can be arranged on the first axle of the vehicle, wherein in particular the first axle of the vehicle is air-sprung. The second axle of the vehicle can be steel-sprung. The vehicle can be a two-axle vehicle, that is, have exactly the first axle and the second axle. The first axle can be a rear axle of the vehicle, so that the rear axle of the vehicle can be an air-sprung axle and/or the rear axle of the vehicle can have the pressure sensor. The pressure sensor is preferably associated with the air-sprung axle. The second axle can be a front axle of the vehicle, so that the front axle of the vehicle can be a steel-sprung axle or also an air-sprung axle and/or the front axle of the vehicle can have only a height sensor and no pressure sensor or auxiliary control unit.

According to an embodiment of the disclosure, the data link is a bus link. In particular, the bus link is a CAN bus link. A main control unit can thus be arranged, for example, in the region of the vehicle in which further superordinate control units are present, while the auxiliary control unit can be arranged, for example, in the region close to one or more actuators that are to be controlled. A data link in the form of a bus link, in particular in the form of a CAN bus link, is particularly advantageous for connecting the main control unit to the auxiliary control unit since a bus link is already planned or present in today's vehicles. A bus link that is already present can be used to achieve communication between the auxiliary control unit and the main control unit without additional cable connections having to be provided.

The disclosure relates additionally to an air suspension system which in particular has an air suspension control system as described hereinbefore and/or which in particular is controllable via an air suspension control system as described hereinbefore. The air suspension system has a first height sensor arranged on the first axle of the vehicle and connected to the input of the auxiliary control unit for determining first height measurements and a second height sensor arranged on the second axle of the vehicle and connected to the input of the auxiliary control unit for determining second height measurements.

According to an embodiment of the disclosure, the air suspension system has an actuator for connection to the air suspension control system. The actuator is a valve drive and is adapted to actuate the flow through the valve opening, connected to the valve drive for actuation, of a valve in a continuous manner or in more than three steps.

It is thereby possible, for example, to adjust the speed with which the ride height is varied. For example, the ride height can thus be changed at a lower speed when the vehicle is moving than when it is stationary in order, for example, not to exert an abrupt influence on the driving dynamics while the vehicle is moving.

In particular in the case of buses, this has the advantage that the ride height can be adjusted particularly quickly when the bus is stopped for the entry and exit of passengers. This is preferably possible via the same valve that assists with level control while the vehicle is moving, without the need for multiple valves connected in parallel.

According to one embodiment, the valve drive has a stepper motor. A stepper motor is adjustable in a simple manner in a plurality of steps, so that, depending on the step size of the stepper motor used, a plurality of steps is possible for actuating the valve. According to one embodiment, the actuator of the air suspension system is configured to be connected to an output of the auxiliary control unit.

The disclosure relates additionally to a vehicle with a first axle and a second axle, which in particular is a commercial vehicle or a passenger vehicle and has an air suspension control system as described hereinbefore and/or an air suspension system as described hereinbefore.

The disclosure relates additionally to a method for operating such a vehicle having an air suspension control system as described hereinbefore and/or an air suspension system as described hereinbefore.

According to an embodiment of the method, control signals are generated at the output of the auxiliary control unit in dependence on functions which are stored in the auxiliary control unit and in dependence on commands which are sent by a main control unit to the auxiliary control unit.

It is possible that the control signals are additionally generated in dependence on sensor signals of at least one sensor connected to the auxiliary control unit. According to an embodiment of the disclosure, control signals are generated at the output of the auxiliary control unit in dependence on the first and/or second height sensor signals at the input and/or in dependence on the pressure sensor signals.

BRIEF DESCRIPTION OF THE DRAWINGS

The invention will now be described with reference to the drawings wherein.

DESCRIPTION OF THE PREFERRED EMBODIMENTS

Figure 1:
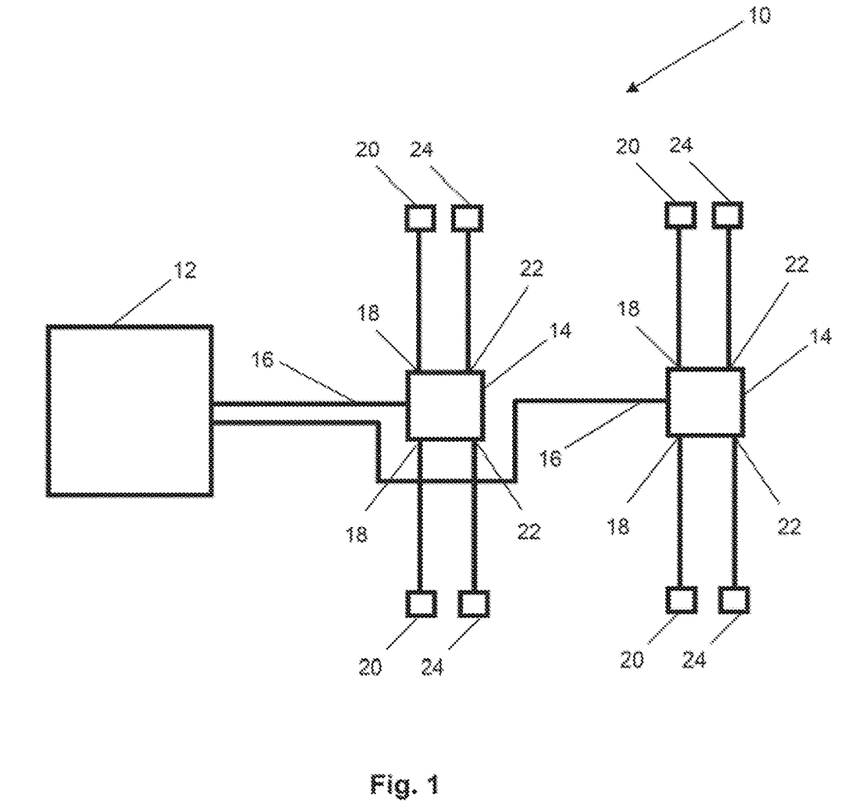
FIG. 1 shows a schematic diagram of an air suspension control system and of an air suspension system having two auxiliary control units in the case of two air-sprung axles.

FIG. 1 shows an air suspension control system 10 and an air suspension system 26 for a vehicle 48. The air suspension control system 10 includes a main control unit 12 and two auxiliary control units 14. The auxiliary control units 14 are each connected to the main control unit 12 via a data link 16. Accordingly, the data link 16 serves to transmit data from the main control unit 12 to the auxiliary control units 14 and from the auxiliary control units 14 to the main control unit 12.

In FIG. 1, the data link 16 is represented by two individual lines, which each include, for example, a plurality of electrical or optical cables. According to another embodiment, which is not shown in FIG. 1, these two lines are not separate and there is a shared data link between the main control unit 12 and the two auxiliary control units 14 (see FIG. 2). This shared data link is preferably a bus system.

Each of the auxiliary control units 14 has two outputs 18, to each of which an actuator 20 is electrically connected. Each of the auxiliary control units 14 additionally includes two inputs 22, to each of which a sensor 24 is connected.

The air suspension control system 10 is configured in such a manner that functions in the auxiliary control units 14 are first called up via the main control unit 12 via the data link 16 and are parameterized. On the basis of these functions, output signals are then generated at the outputs 18 for the actuators 20 in dependence on the function and also on sensor data which are provided via the sensors 24 to the inputs 22 of the auxiliary control units 14. Functions are, for example, the raising or lowering of a vehicle with the air suspension control system or the tilting of the vehicle or level control during or after loading of a vehicle.

Figure 2:
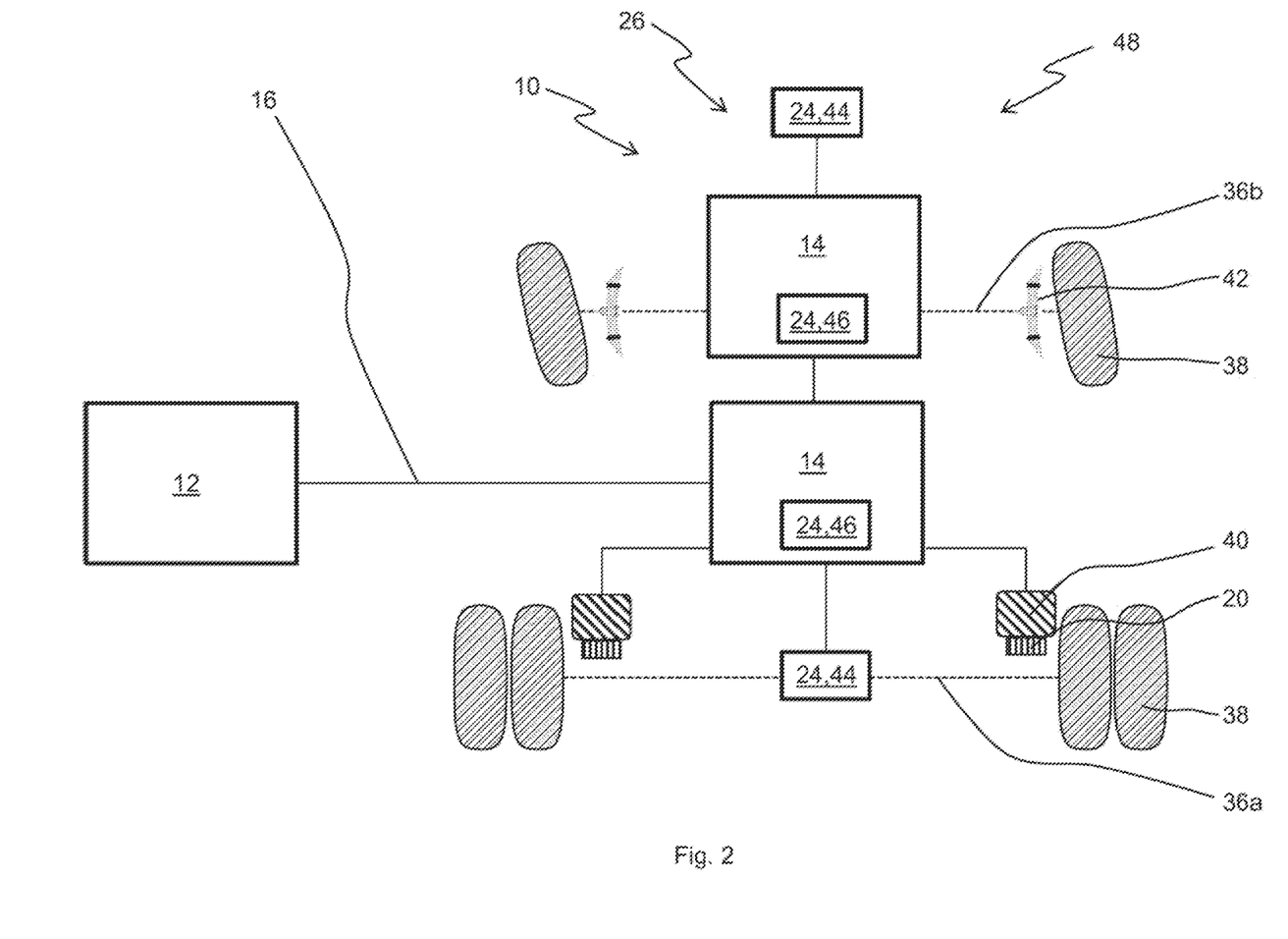
FIG. 2 shows a schematic diagram of an air suspension control system and of an air suspension system having two auxiliary control units in the case of an air-sprung axle and a steel-sprung axle.

FIG. 2 shows an air suspension control system 10 and an air suspension system 26 corresponding to FIG. 1. The air suspension control system 10 likewise includes a main control unit 12 and two auxiliary control units 14, wherein the auxiliary control units 14 are connected to the main control unit 12 via a data link 16. In FIG. 2, the data link 16 is represented schematically as a single line, which includes, for example, a plurality of electrical or optical cables. The data link 16 can in this way form a shared data link 16 between the main control unit 12 and the two auxiliary control units 14, for example in the form of a bus system. The data link can, however, also include two or more individual lines.

In contrast to FIG. 1, it is shown in FIG. 2 that, of two axles 36 of the vehicle with wheels 38, only one axle 36a is air-sprung and accordingly has air-suspension bellows 40 with actuators 20. The other axle 36b is steel-sprung and accordingly has steel springs 42.

FIG. 2 shows two different types of sensors 24: on the one hand, a pressure sensor 46 is arranged in each of the auxiliary control units 14. By associating an auxiliary control unit 14 with each of the axles 36, a pressure sensor 46 is thus also associated with each of the axles 36. Furthermore, a height sensor 44 is associated with each of the axles 36, wherein precisely one height sensor 44 is here associated with each of the auxiliary control units 14, wherein the auxiliary control unit 14 and the height sensor 44 associated therewith are in each case associated with the same axle 36.

Figure 3:
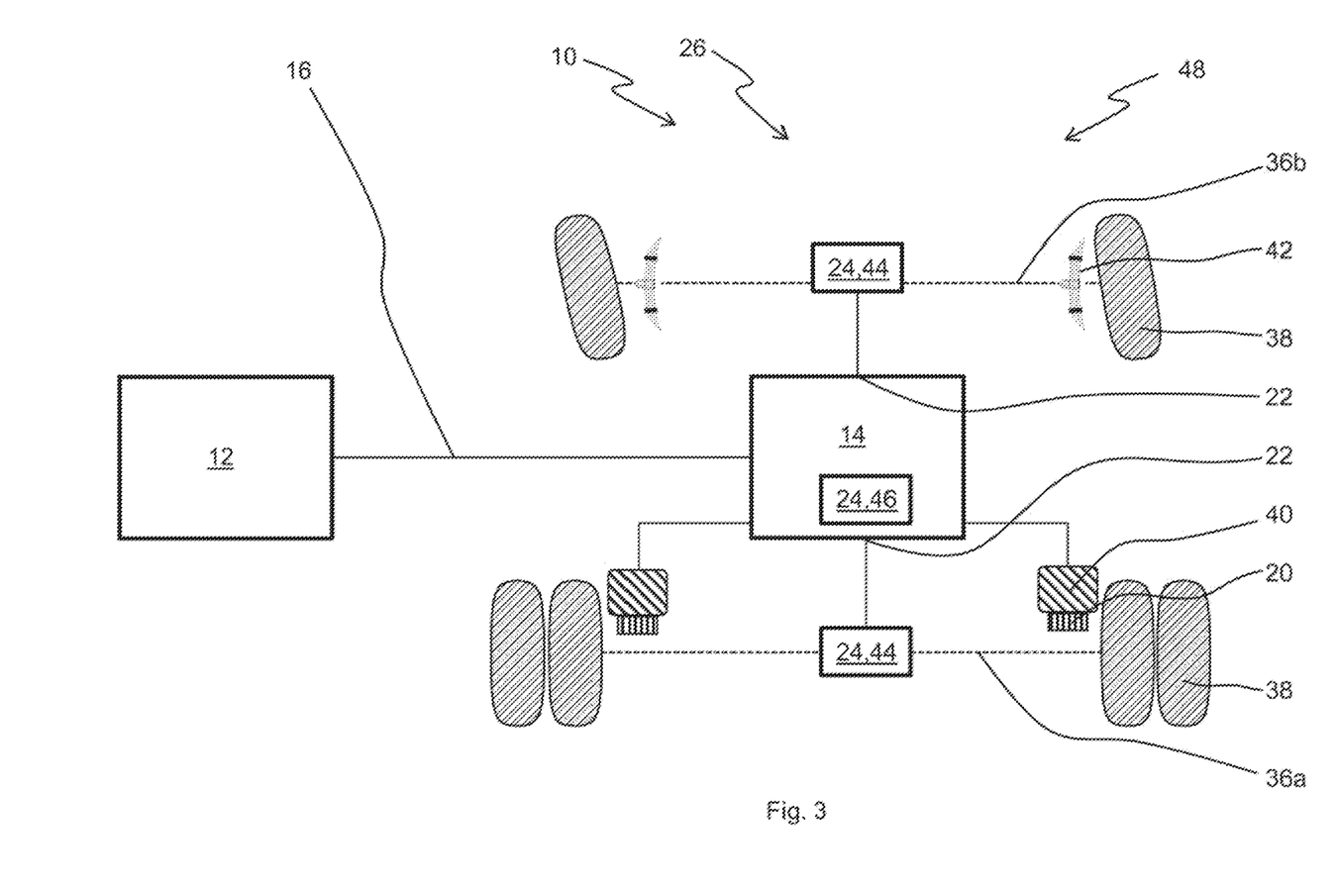
FIG. 3 shows a schematic diagram of an air suspension control system and of an air suspension system having one auxiliary control unit in the case of an air-sprung axle and a steel-sprung axle; and, FIG. 4 shows an air suspension system having an air suspension control system.

FIG. 3 shows, in an analogous manner to FIG. 2, an air suspension control system 10 having a main control unit 12. The air suspension control system 10 according to FIG. 3 is likewise arranged on a vehicle which has an air-sprung axle 36a and a steel-sprung axle 36b. According to FIG. 3, however, an auxiliary control unit 14 is arranged only on the air-sprung axle 36a. Accordingly, a pressure sensor 46 is also associated only with the air-sprung axle 36a. However, a height sensor 44 is associated with both the air-sprung axle 36a and the steel-sprung axle 36b. The two height sensors 44 are associated with the same auxiliary control unit 14 arranged on the air-sprung axle 36a. This is possible because the auxiliary control unit 14 has two inputs 22 for height sensor data. It is, however, also possible that the two height sensors 44 are connected to the same input 22 of the auxiliary control unit.

Because there is here only one air-sprung axle 36a at which air-suspension bellows 40 must be actuated via the actuators 20, one auxiliary control unit 14 is sufficient for fully controlling the air suspension of the vehicle. However, by associating the height sensor 44 of the steel-sprung axle 36b with the auxiliary control unit 14 in addition to the height sensor 44 of the air-sprung axle 36a and the pressure sensor 46 of the air-sprung axle 36a, the auxiliary control unit 14 and the main control unit 12 can evaluate the sensor data of the sensors 24, 44, 46 such that additional functions that go beyond mere air suspension can be ensured.

A deflection of the air-sprung axle 36a and/or of the steel-sprung axle 36b can be determined from the height sensor data of the height sensor 44 of the air-sprung axle 36a and/or the height sensor data of the height sensor 44 of the steel-sprung axle 36b. Determination of the deflection can be carried out by the main control unit 12 in that the height sensor data are transmitted by the auxiliary control unit 12 to the main control unit via the data link 16. The pressure sensor data can also be transmitted by the auxiliary control unit 14 to the main control unit via the data link 16. The main control unit 12 can carry out on-board weighing for the steel-sprung axle 36b on the basis of the deflection thereof and for the air-sprung axle on the basis of the pressure sensor data, which can indicate a bellows pressure in the air-suspension bellows 40.

Figure 4:
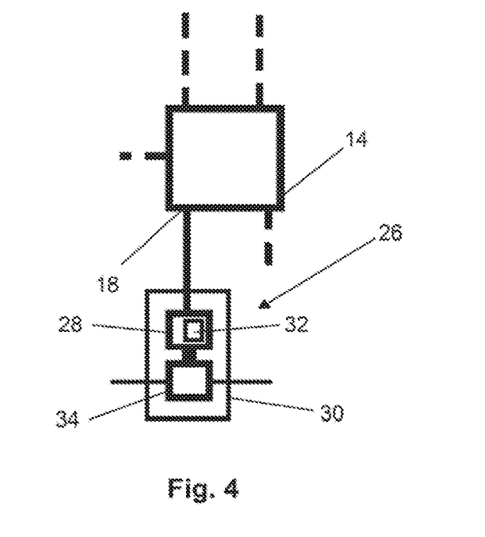

FIG. 4 shows an air suspension system 26 which is controllable via the air suspension control system 10. The air suspension system here has an actuator 20 which is in the form of a valve drive 28. The valve drive 28 is accordingly connected to an output 18 of the auxiliary control unit 14. The valve drive 28 is part of a valve 30 and has a stepper motor 32 for actuating a valve opening 34 of the valve 30 in a continuous manner or in more than three steps.

The valve 30 is thus actuated by the auxiliary control unit 14 in such a manner that a step of the valve opening 34 which is desired is provided for the valve drive 28. The valve drive 28 then adjusts the valve opening 34 according to the desired step via the stepper motor 32. The flow through the valve 30 is thereby varied in such a manner that, for example, slow or rapid raising of a vehicle is made possible by filling a cylinder with gas, in particular air, according to the flow.

It is understood that the foregoing description is that of the preferred embodiments of the invention and that various changes and modifications may be made thereto without departing from the spirit and scope of the invention as defined in the appended claims.

LIST OF REFERENCE NUMERALS (PART OF THE DESCRIPTION)

10 air suspension control system
12 main control unit
14 auxiliary control unit
16 data link
18 output for connection of an actuator
20 actuator
22 input for acquisition of sensor data
24 sensor
26 air suspension system
28 valve drive
30 valve
32 stepper motor
34 valve opening
36 axle
38 wheel
40 air-suspension bellows
42 steel spring
44 height sensor
46 pressure sensor
48 vehicle

What is claimed is:

1. An air suspension control system for a vehicle having a first axle and a second axle, the air suspension control system comprising:
a main control unit for operating the air suspension control system;
an auxiliary control unit connected to said main control unit via a data link;
said auxiliary control unit having a pressure sensor associated with the first axle of the vehicle and configured to determine pressure measurements of the first axle as pressure sensor signals;
said auxiliary control unit having an input for receiving height sensor signals;
said input being connectable to a first height sensor arranged on the first axle for receiving first height measurements as first height sensor signals and to a second height sensor arranged on the second axle for receiving second height measurements as second height sensor signals;
said auxiliary control unit being configured to transmit at least one of the first height sensor signals, the second height sensor signals, and the pressure sensor signals to said main control unit via the data link; and,
said main control unit being configured to carry out on-board weighing for at least one of the first axle and the second axle in dependence on at least one of the first height sensor signals, the second height sensor signals, and the pressure sensor signals.

2. The air suspension control system of claim 1, wherein at least one of a) said input of said auxiliary control unit is configured to be connected to a further sensor in order to receive further sensor signals; and, b) said auxiliary control unit has a further input configured to be connected to the further sensor in order to receive the further sensor signals.

3. The air suspension control system of claim 1, wherein said auxiliary control unit has an output for actuating an actuator which is connectable to said output; wherein said auxiliary control unit is configured to store a function for generating control signals at the output; said main control unit is configured to at least one of call up and parameterize at least said function stored in said auxiliary control unit by transmitting commands via the data link; and, wherein said auxiliary control unit is configured to generate the control signals at said output in dependence on at least one of the first height sensor signal at said input, the second height sensor signals at said input, and the pressure sensor signals.

4. The air suspension control system of claim 3, wherein said auxiliary control unit is configured to receive and interpret at least one predefined fixed set of commands from said main control unit.

5. The air suspension control system of claim 3, wherein said auxiliary control unit is configured, after receiving the command sent by said main control unit and received via the data link, to transmit at least one of first height sensor signals, second height sensor signals, and pressure sensor signals to said main control unit.

6. The air suspension control system of claim 1, wherein said auxiliary control unit is configured to store a predefined fixed set of functions in said auxiliary control unit.

7. The air suspension control system of claim 1, wherein said auxiliary control unit is arranged on the first axle of the vehicle.

8. The air suspension control system of claim 1, wherein at least one of a) the first axle of the vehicle is air-sprung; and, b) the second axle of the vehicle is steel-sprung.

9. The air suspension control system of claim 1, wherein the vehicle is a two-axle vehicle and the first axle of the vehicle is a rear axle of the vehicle and the second axle of the vehicle is a front axle of the vehicle.

10. The air suspension control system of claim 1, wherein said data link is at least one of a bus link and a CAN bus link.

11. An air suspension system for a vehicle, the air suspension system comprising:
   an air suspension control system configured to control the air suspension system;
   a main control unit for operating the air suspension control system;
   an auxiliary control unit having an input and being connected to said main control unit via a data link;
   a first height sensor arranged on a first axle of the vehicle and connected to said input of said auxiliary control unit for determining first height measurements; and,
   a second height sensor arranged on a second axle of the vehicle and connected to said input of said auxiliary control unit for determining second height measurements
   said auxiliary control unit having a pressure sensor associated with the first axle of the vehicle and being configured to determine pressure measurements of the first axle as pressure sensor signals;
   said input of said auxiliary control unit being configured to receive the first height measurements as first height sensor signals and the second height measurements as second height sensor signals;
   said auxiliary control unit being configured to transmit at least one of the first height sensor signals, the second height sensor signals, and the pressure sensor signals to said main control unit via said data link; and,
   said main control unit being configured to carry out on-board weighing for at least one of the first axle and the second axle in dependence on at least one of the first height sensor signals, the second height sensor signals, and the pressure sensor signals.

12. The air suspension system of claim 11 further comprising:
   an actuator configured to connect to the air suspension control system;
   said actuator being a valve drive; and,
   said valve drive being configured to actuate a flow through a valve opening of a valve in a continuous manner or in more than three steps, wherein the valve drive is connected to said valve opening for actuation.

13. The air suspension system of claim 12, wherein said valve drive includes a stepper motor.

14. The air suspension system of claim 12, wherein said actuator is configured to be connected to at least one output of the auxiliary control unit.

15. A vehicle comprising:
   a first axle;
   a second axle;
   at least one of an air suspension control system and the air suspension system of claim 11.

16. The vehicle of claim 15, wherein the vehicle is a commercial vehicle or a passenger vehicle.

17. A method for operating a vehicle having a first axle and a second axle via an air suspension control system; the air suspension control system including a main control unit and an auxiliary control unit having a pressure sensor associated with the first axle and an input; the auxiliary control unit being connected to the main control unit via a data link, the method comprising:
   determining pressure measurements of the first axle as pressure sensor signals via the auxiliary control unit;
   receiving, at the input of the auxiliary control unit, first height sensor signals from a first height sensor arranged on the first axle of the vehicle and second height sensor signals from a second height sensor arranged on the second axle of the vehicle, wherein the first height sensor and the second height sensor are connectable to the input of the auxiliary control unit;
   transmitting at least one of the first height sensor signals, the second height sensor signals, and the pressure sensor signals from the auxiliary control unit to the main control unit via the data link; and,
   carrying out on-board weighing for at least one of the first axle and the second axle in dependence on at least one of the first height sensor signals, the second height sensor signals, and the pressure sensor signals.

18. The method of claim 17, wherein control signals are generated at an output of the auxiliary control unit in dependence on functions which are stored in the auxiliary control unit and in dependence on commands which are sent by the main control unit to the auxiliary control unit.

19. The method of claim 17, wherein control signals are generated at an output of the auxiliary control unit in dependence on at least one of the first height sensor signals at the input, second height sensor signals at the input, and the pressure sensor signals.

* * * * *